Jan. 23, 1951  R. J. KOLL  2,539,307
METHOD OF MAKING VINYL CHLORIDE
Filed Oct. 8, 1948
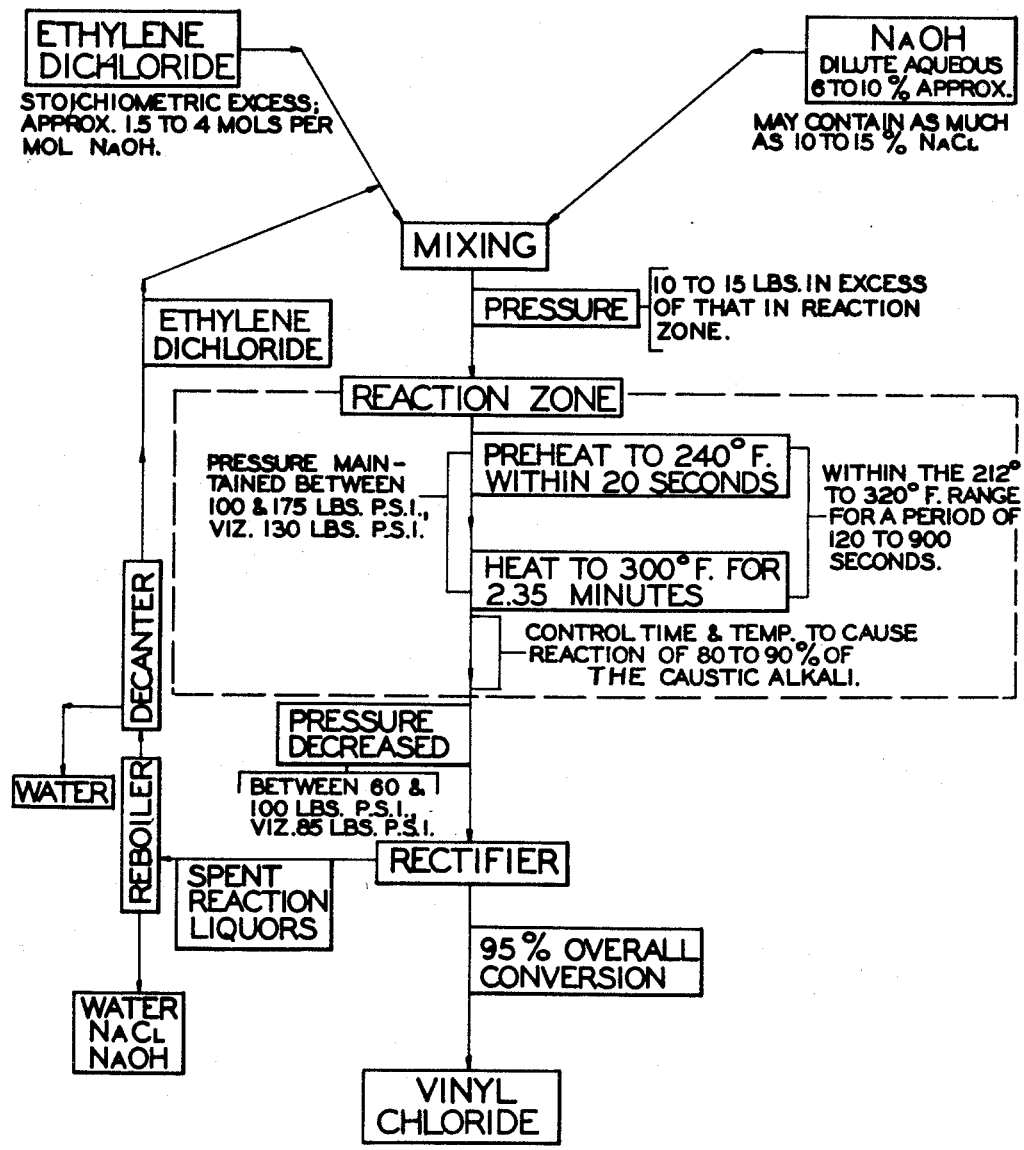
ROBERT J. KOLL Inventor
By Thornton F. Holder
Attorney Patented Jan. 23, 1951

2,539,307

UNITED STATES PATENT OFFICE 2,539,307

METHOD OF MAKING VINYL CHLORIDE

Robert J. Koll, Painesville, Ohio, assignor to Diamond Alkali Company, Cleveland, Ohio, a corporation of Delaware Application October 8, 1948, Serial No. 53,426

3 Claims. (Cl. 260—656)

This invention relates to a method for dehydrochlorinating ethylene dichloride to obtain vinyl chloride and more particularly relates to a method for chemically dehydrochlorinating ethylene dichloride continuously to obtain consistently high yields of vinyl chloride.

It has heretofore been proposed to dehydrochlorinate ethylene dichloride to vinyl chloride by employing dilute aqueous caustic alkali in stoichiometric excess to the ethylene dichloride, while subjecting the mixture to elevated temperatures and moderately high pressures. In order to obtain economically satisfactory yields of vinyl chloride, necessary adjuncts to these conditions have included the providing of violent mechanical agitation of the mixture of ethylene dichloride and dilute aqueous caustic alkali, extended periods of contact of the reactants, stoichiometric excess of caustic alkali, and buffering of the aqueous alkaline material.

In an integrated system designed for continuous operation, providing the large amounts of energy necessary for the combined conditions of violent mechanical agitation, high temperatures, and high pressures is economically burdensome and for that reason, the prior art methods for producing vinyl chloride by the dehydrochlorination of ethylene dichloride have been less desirable than other methods for producing vinyl chloride, such as the addition of hydrogen chloride to the triple bond of acetylene.

It has been found that under the influence of temperatures substantially above 100° C. and at pressures in excess of atmospheric pressure, the solubility of ethylene dichloride in dilute aqueous caustic alkali solutions is greatly increased. Further it has been found, in accordance with the method of the present invention, that advantage may be taken of this phenomenon in such a manner that violent mechanical agitation, buffering the alkaline medium, and extended periods of contact time of ethylene dichloride and aqueous caustic alkali are unnecessary, and moreover, that unexpectedly increased yields of vinyl chloride result especially where ethylene dichloride is employed in stoichiometric excess over the amount of available caustic alkali in contact therewith.

The present invention has as one of its objects the avoidance of various disadvantages and inefficiencies of the prior art methods, and has as a further object the provision of an efficient continuous cyclic operation which, though it employs relatively impure reactants throughout, results in high yields of vinyl chloride and in which the unreacted reactants may be efficiently reused to obtain a maximum reaction efficiency at a very low raw material cost.

In fulfilling these objects, the present invention contemplates employing dilute aqueous caustic alkali solutions which may suitably be crude or impure solutions, such, for example, as the solution of sodium hydroxide obtained in the commercial production of sodium hydroxide and chlorine by the electrolysis of brine, which solutions normally contain from 6% to 10% of sodium hydroxide, 10% to 15% of sodium chloride, and minor amounts of other impurities, and thoroughly pre-mixing said solution with ethylene dichloride, which may suitably be the ordinary commercial grade in stoichiometric excess of the available caustic alkali in the solution. Further it is contemplated by the method of the present invention, after premixing the aqueous caustic alkali and ethylene dichloride, to pass these materials through a heated reaction zone and to heat the ingredients in the reaction zone to reaction temperatures under autogenous pressure to effect the dehydrochlorination reaction. Moreover, it is contemplated by the method of the present invention to return unreacted ethylene dichloride to the reaction zone. By the above-described method of operation, substantially complete conversion of ethylene dichloride to vinyl chloride is obtained without the necessity for providing violent mechanical agitation of large volumes of the two reactants within the reaction zone, and a definite economic advantage thereby obtains.

The attached drawing is a chemical flow-sheet primarily illustrating the method of the present invention and indicating certain equivalents and variations which may be used therein. The specificities of the flow-sheet refer to conditions of operation found in general to produce the maximum yield of the desired product. Variations from the specific teachings of the flow-sheet, which are within the scope of the appended claims, are in part indicated hereinafter and in part obvious. Therefore, it will be advantageous for those skilled in the art frequently to refer to the flow-sheet as the more general and then the more specific aspects of the present invention are considered in turn.

In accordance with the method of the present invention, a continuous cyclic system for preparing vinyl chloride from ethylene dichloride is provided, which method includes pre-mixing dilute aqueous caustic alkali and a stoichiometric excess thereover of ethylene dichloride, conducting the resulting mixture to a reaction zone, continuously passing said mixture through said reaction zone, while simultaneously heating said mixture to a temperature substantially within the range of 212° to 320° F., and maintaining said zone under the autogenous pressure of said reacting mixture, thereafter conducting the products of reaction and unreacted reactants from said reaction zone to a rectifier under a pressure less than said autogenous pressure of said reaction zone, and separately recovering vinyl chloride and a mixture of unreacted ethylene dichloride with an aqueous phase from said rectifier.

More particularly, in accordance with the method of the present invention, dilute aqueous caustic alkali, which may be relatively impure caustic soda solution, such as the caustic soda solution obtained from the commercial electrolysis of brine, there being no particlar need in practicing the method of the present invention for further refinement of the caustic soda solution, is pre-mixed with commercial ethylene dichloride in any suitable manner and preferably at temperatures well below reaction temperatures, such as room temperature. For example, it has been found suitable in one embodiment of the method of the present invention to meter the two liquid materials into a common conduit and conduct this roughly interspersed mixture to a pump, such as a centrifugal pump. The pump thereafter effects further pre-mixing of the two liquids at temperatures well below the reaction temperature, while supplying such pressure as is necessary in order to bring the mixture of reactants into the closed reaction zone at the ambient pressure therein, which pressure is quite naturally dependent upon the reaction temperature and the rate of release of the reactants and products of reaction from the reaction zone and may suitably be of the order of 100 to 175 p. s. i. and most advantageously at about 130 p. s. i. The pressure at the pump is suitably adjusted to about 10–15 pounds in excess of the ambient pressure within the reaction zone. The reactor is preferably a tubular type jacketed for application of heat thereto as by steam or other suitable heat transfer fluid and of sufficient length to afford a contact time necessary for the reactants to reach reaction temperature and remain in contact for a period of about 2 to 5 minutes.

The diameter of the reactor tube is preferably small in proportion to its length in order that relatively high velocities of the reactants therethrough may be maintained, to the end that a high heat transfer rate therein may obtain. The combination of a relatively small diameter reactor tube and high velocity of reactants therein allows the reactants to be heated to the reaction temperature in a minimum length of time commensurate with the desired production of a given production unit.

It is also preferable for economic reasons to include a preheating zone as a part of the reaction zone and suitably after the pump pre-mixing, wherein the interspersed reactants are heated initially to a temperature approaching that at which appreciable reaction takes place, such as a temperature of the order of 212° to 240° F. In general, the velocity of the mixture of reactants through the pre-heating zone is preferably maintained higher than that in the reactor because of the greater temperature differential therein, i. e. from approximately room temperature to a temperature within the range of 212° F. to 240° F. It is therefore desirable to have a smaller diameter tube in the pre-heating zone than that of the reactor in order to effect maximum heat transfer to the reactants therein in a minimum of time.

Thereafter, the reactants are brought into the reaction zone whereby application of heat to the reactor, they are rapidly brought to the reaction temperature, the preferred range of which is of the order of 290° to 320° F. At the discharge end of the reactor, the mixture of reaction products and unreacted reactants is conducted to a rectifier which preferably operates at a pressure substantially less than the ambient pressure within the reaction zone, such as a pressure of 60 to 100 p. s. i., and wherein separation of the vinyl chloride and spent reaction liquors is made by conventional rectification treatment. The spent reaction liquors are suitably conducted to a reboiler or the like, wherein unreacted ethylene dichloride is separated from spent aqueous caustic alkali liquors; the unreacted ethylene dichloride is returned to the initial supply line therefor. The spent aqueous solution of caustic alkali and sodium chloride may, if desired, be saturated with salt and combined with saturated brine used in the commercial production of chlorine and caustic alkali; the caustic alkali values are thereby suitably recovered from the spent reaction liquors and further add to the economics of the method.

In order that the invention may better be understood by those skilled in the art and in order that a more fully detailed method of its actual practice may be disclosed, the following specific example is offered:

*Example*

A dilute aqueous caustic alkali liquor obtained from electrolytic cells used in the commercial production of caustic soda and chlorine and containing 6% NaOH and 13.3% NaCl, metered at the rate of 215 pounds per hour, and ethylene dichloride metered at the rate of 15.8 pounds per hour, are fed to a common conduit. This conduit leads to a gear pump, wherein further mixing of the ingredients is obtained, the pressure increased to 145 pounds per square inch, and the temperature of the ingredients to approximately 90° F. The mixture thereafter is fed to a pre-heater, made up of jacketed ⅛ inch I. D. steel tubing, through which it travels at the rate of about 2.36 feet per second, traversing the length of the pre-heater in approximately 20 seconds. In the pre-heater, the temperature of the mixture is raised to 240° F. From the pre-heater, the mixture of ethylene dichloride and aqueous caustic alkali liquor is fed to a tubular reactor ⅜ inch in diameter, the velocity of the mixture of reactants therethrough being reduced to 0.68 feet per second; the time required to pass through the reactor tube is 2.35 minutes, during which time the temperature of the reactants is raised to 300° F. The autogenous pressure attained within the reactor under operating conditions is 130 pounds per square inch. From the reactor, the products of reaction and unreacted reactants are conducted to a rectifier operating at a pressure of 85 pounds per square inch, wherein vinyl chloride is separated from the reaction liquors by rectifying distillation and is conducted to suitable storage vessels maintained at a temperature not in excess of about 100° F., at the rate of about 9½ pounds per hour. The pressure upon the rectifier is suitably controlled by adjusting the temperature at which the vinyl chloride is condensed. The spent reaction liquor, comprising an aqueous solution of unreacted sodium hydroxide, sodium chloride, and unreacted ethylene dichloride containing some dissolved vinyl chloride, is conveyed to a reboiler operating at about 225° F. In the reboiler, the ethylene dichloride is separated from the aqueous phase by distillation of an azeotrope of ethylene dichloride and water, followed by decantation separation of the two phases of the azeotrope. The ethylene dichloride is subsequently returned to the feed line from ethylene dichloride storage. The spent reaction liquor obtained as an effluent from the reboiler may be saturated with NaCl and combined with saturated brine solution entering commercial electrolytic cells, wherein caustic soda and chlorine are produced. When the process of the present invention is carried out as hereinabove described as a continuous cyclic process over extended periods of operation, it is found that the conversion of ethylene dichloride to vinyl chloride amounts to 95% of the theoretical possible amount.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The continuous method for the preparation of vinyl chloride from ethylene dichloride, which includes mixing together dilute aqueous caustic alkali and a stoichiometric excess thereof of ethylene dichloride, conducting the resulting mixture to a reaction zone, continuously passing said mixture through said reaction zone, while simultaneously heating said mixture to a temperature within the range of 212° to 320° F., maintaining said mixture in said zone under substantially autogenous pressure, continuously conducting the products of reaction and unreacted reactants from said reaction zone to a rectifier under a pressure less than said autogenous pressure of said reaction zone, and separately recovering vinyl chloride, and a mixture of ethylene dichloride with an aqueous phase from said rectifier.

2. The continuous method for the preparation of vinyl chloride from ethylene dichloride, which includes mixing together dilute aqueous caustic alkali and a stoichiometric excess thereover of ethylene dichloride, conducting the resulting mixture to a reaction zone, continuously passing said mixture through said reaction zone, while simultaneously heating said mixture to a temperature within the range of 212° to 320° F., maintaining said mixture in said zone under substantially autogenous pressure, continuously conducting the products of reaction and unreacted reactants from said reaction zone to a rectifier under a pressure less than said autogenous pressure of said reaction zone, separately recovering vinyl chloride, and a mixture of ethylene dichloride with an aqueous phase, from said rectifier, separating unreacted ethylene dichloride from said last mixture, returning said unreacted ethylene dichloride to said reaction zone, and recovering caustic alkali from said aqueous phase.

3. The continuous method for the preparation of vinyl chloride from ethylene dichloride in the substantial absence of hydroxy organic compounds, which includes mixing together dilute aqueous caustic alkali and a stoichiometric excess thereover of ethylene dichloride, heating said mixture initially to a temperature substantially within the range of 212° to 240° F. in a pre-heating zone, subsequently rapidly increasing the temperature of said mixture to a temperature within the range 290° to 320° F. in a reaction zone, while maintaining said mixture in fluid flow in said zones under substantially autogenous pressure, continuously conducting the products of reaction and unreacted reactants from said reaction zone to a rectifier under a pressure less than said autogenous pressure of said reaction zones, separately recovering vinyl chloride, and a mixture of ethylene dichloride with an aqueous phase, from said rectifier, separating unreacted ethylene dichloride from said last mixture, returning said unreacted ethylene dichloride to said pre-heating zone, and recovering caustic alkali from said aqueous phase.

ROBERT J. KOLL.

REFERENCES CITED

The following references are of record in the file of this patent:

UNITED STATES PATENTS

| Number | Name | Date |
|---|---|---|
| 2,041,814 | Brous | May 26, 1936 |